Aug. 9, 1932.   S. J. WILLIAMSON   1,870,883
RUBBERIZED FABRIC
Filed Dec. 11, 1929

INVENTOR
Stanley Jacoby Williamson
BY
ATTORNEY

Patented Aug. 9, 1932

1,870,883

UNITED STATES PATENT OFFICE

STANLEY JACOBY WILLIAMSON, OF BELMONT, MASSACHUSETTS, ASSIGNOR TO AMERICAN RUBBER COMPANY, OF EAST CAMBRIDGE, MASSACHUSETTS, A CORPORATION OF MASSACHUSETTS

RUBBERIZED FABRIC

Application filed December 11, 1929. Serial No. 413,310.

This invention relates to rubberized fibrous material and a process of making the same.

It is an object of this invention to provide a rubberized fabric which simulates leather in appearance and feel. Another object of the invention is to provide a rubber fabric in which the rubber is present only in the nap of the fibrous material. Another object of the invention is to provide an imitation leather having the feel of leather and having the bulk and flexibility of leather. Other objects and advantages of the invention will appear in the following detailed description taken in connection with the accompanying drawing, in which.

Figure 1:
Fig. 1 is a cross section of the material of this invention.

According to this invention fibrous material which may be either woven or unwoven fabric having a nap on one or more sides is provided. Such material is represented at 1 in Fig. 1. While the material may be of any desired nature, it preferably is of a cotton fabric having a nap on either one or both sides.

The nap 2 of the fibrous material 1 is impregnated with rubber by spreading a rubber solution over the nap using a doctor knife or similar means. The cement preferably is rather dilute and of low viscosity in order that it may thoroughly impregnate the nap. The manner of application of the cement to the nap is such as to impregnate the nap only leaving the body of the fibrous material substantially free of rubber. The solvent of the cement is removed in any suitable way as by heating.

Next a layer of rubber is applied to the rubberized nap. Preferably the layer of rubber such as shown at 3 is applied by calendering, although it may be laid down on the nap in any other suitable manner. Due to the fact that the nap gives somewhat during the application of the sheet of rubber 3 thereon, the sheet of rubber takes on various crinkles and wrinkles such as are frequently present on the surface of leather.

Over the surface of the layer of rubber 3 is applied a mixture of rubber and comminuted leather 4 which preferably is applied by spreading, using a doctor knife or other suitable means. Inasmuch as the layer 4 is applied in the form of a cement, the surface of the layer takes the characteristics of the surface of the layer 3, that is the surface of the layer 4 shows the wrinkles and crinkles of the layer 3 which causes it to resemble the surface of leather. In addition the comminuted leather in the rubber of the layer 4 gives the surface a leather-like feel. While according to the preferred form of the invention the layers 3 and 4 are applied separately, the two layers may be combined into one with the comminuted leather therein, if desired, and the single layer may be applied in any suitable manner as by spreading.

The assembly as shown in Fig. 1 is then vulcanized. The surface layer 4 may be treated with sulphur chloride or bromine if desired in order to remove any surface tack.

Figure 2:
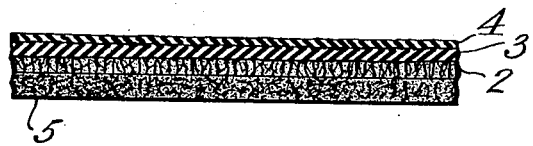
Figs. 2 and 3 are cross sections of modified forms of the invention.

While according to the preferred form of the invention, the base fibrous material 1 is not impregnated with rubber in order that the composite article be more flexible, yet this may be done according to a modified form of the invention as shown in Fig. 2. In that figure, the base material 5 is shown as impregnated with rubber. This impregnation may be and preferably is effected by simultaneously passing the fibrous material between squeeze rollers and applying the rubber in the form of a cement to the fabric. Squeeze rollers serve to drive the rubber cement into the body of the fibrous material and leave subtantially none of the rubber in the nap. Squeeze rolls are simply metallic rolls of small diameter rotating at the same speed and juxtaposed for the passage of the fabric therebetween. The other operations in making the rubberized fabric as shown in Fig. 2 are those hereinbefore outlined in connection with Fig. 1.

According to the process, particularly as described in connection with Fig. 1, a new composition of matter which has a surface having a leather-like feel due to the presence of comminuted leather in the surface layer of rubber, and having a leather-like appearance due to the presence of crinkles and wrinkles formed in the surface layer which resembles the surface characteristics of leather, and which has the flexibility and lightness compared to bulk or, in other words, bulkiness compared to weight which approximates that of leather. In addition the material of both Figs. 1 and 2 is waterproof. The product of Fig. 2 has many of the characteristics of that shown in Fig. 1 although due to the presence of rubber in the body of the base fibrous material 5 the composition of Fig. 2 is somewhat less flexible and somewhat heavier as compared to the material shown in Fig. 1.

Figure 3:

The composition composed of the base material 1 and bearing the surface layer of rubber impregnated pile 2 may be made as a completed composition as shown in Fig. 3 for use in that form, or for further use in other manufacturing operations. Such an article is substantially waterproof due to the presence of the rubber in the pile and has leather like characteristics in that it is bulky as compared to weight and has great flexibility.

While certain preferred forms of the invention have been disclosed by way of illustration, it is not intended so to limit the invention for many variations in the details thereof may be made without departing from the scope of the invention defined in the following claims.

Having thus described my invention what I claim and desire to protect by Letters Patent is:

1. Process of making rubberized fabric which comprises providing a fabric having a nap on at least one surface, impregnating the nap with rubber, applying a sheet of rubber on the rubberized nap, applying a leather and rubber mixture over the rubber sheet, and vulcanizing the assembly.

2. A process of making rubberized fabric which comprises continuously advancing a fabric having a nap on at least one surface, spreading rubber solution on the nap, drying the solution, calendering a sheet of rubber on to the rubberized nap, spreading a mixture of rubber and leather over the rubber sheet, and vulcanizing the assembly.

3. The process of making rubberized fabric which comprises providing a fabric having a nap on at least one surface, impregnating the nap with rubber, and applying a layer of rubber containing comminuted leather on to the rubberized nap, and vulcanizing the assembly.

4. Process of making rubberized fabric which comprises providing a fabric having a nap on at least one surface, impregnating the body of the fabric with rubber, impregnating the nap with a solution of rubber adhesive, applying to the nap a layer of rubber containing comminuted leather, treating with bromine and vulcanizing the assembly.

5. A new article comprising fibrous material having a nap, a crinkly layer of rubber containing comminuted leather on the nap, the nap and layer of rubber being united by rubber adhesive, and the rubber being vulcanized.

6. A new article comprising fibrous material having a nap impregnated with rubber, a layer of vulcanized rubber containing comminuted leather on the nap, said layer of rubber having the surface characteristics of leather.

7. A new article comprising fibrous material having a nap and being impregnated with rubber, a layer of rubber containing comminuted leather on the nap, the nap and rubber being united by vulcanization, and the surface of the rubber having the characteristics of leather.

8. A new article comprising fibrous material having a nap, said nap being impregnated with rubber, a layer of rubber on the nap and a crinkly coating of rubber and comminuted leather on the layer of rubber, the rubber being vulcanized and the rubber and nap being united by vulcanization.

9. An article of manufacture comprising in combination a sheet of fibrous material having a nap impregnated with rubber dried from solution and a vulcanized layer of rubber united thereto.

10. An article of manufacture comprising in combination a sheet of fibrous material having a nap impregnated with rubber dried from solution and a layer of rubber containing comminuted leather vulcanizingly united thereto.

Signed at East Cambridge, county of Middlesex, State of Massachusetts, this 5th day of December, 1929.

STANLEY JACOBY WILLIAMSON.